Feb. 11, 1941.  W. W. ACHÉ  2,231,312
COMBINED BUMPER AND HEADLIGHT
Filed Jan. 23, 1939  2 Sheets-Sheet 1
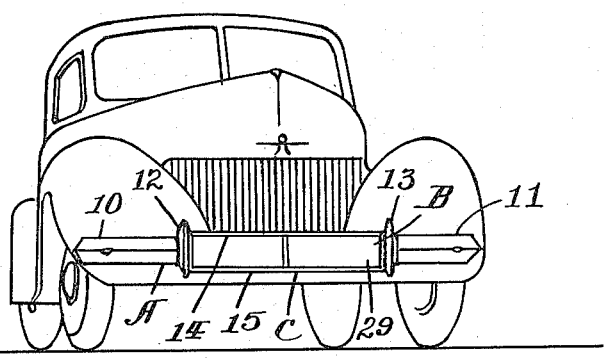
Fig. 1.
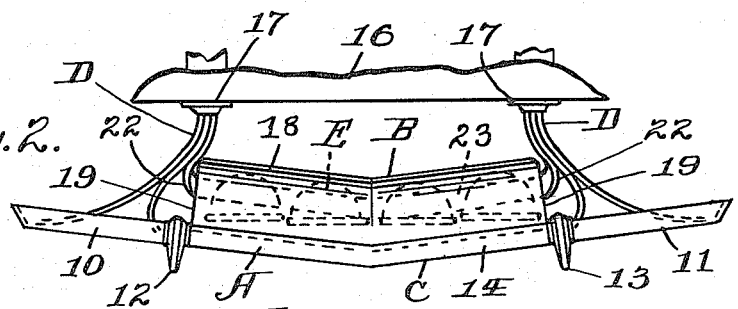
Fig. 2.
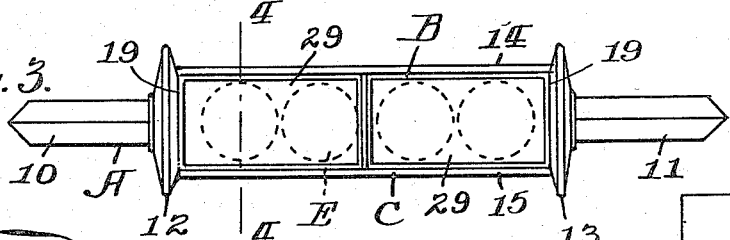
Fig. 3.
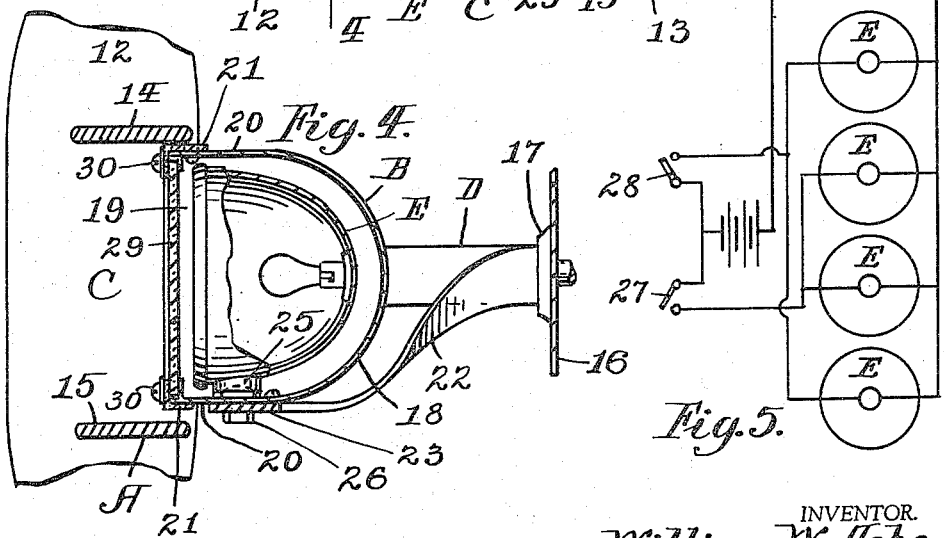
Fig. 4.
Fig. 5.
INVENTOR.
William W. Aché,
BY
ATTORNEY.

Feb. 11, 1941.  W. W. ACHÉ  2,231,312
COMBINED BUMPER AND HEADLIGHT
Filed Jan. 23, 1939  2 Sheets-Sheet 2
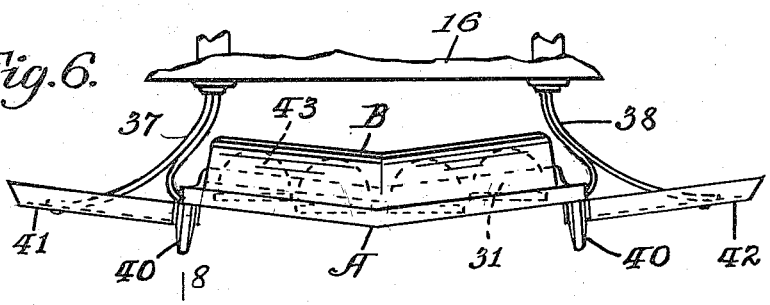
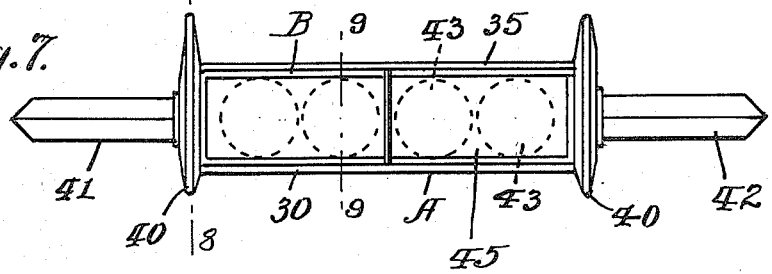
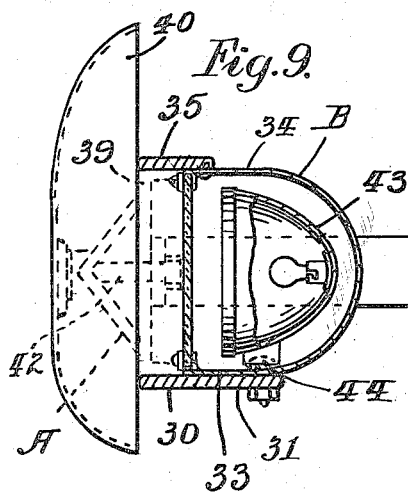
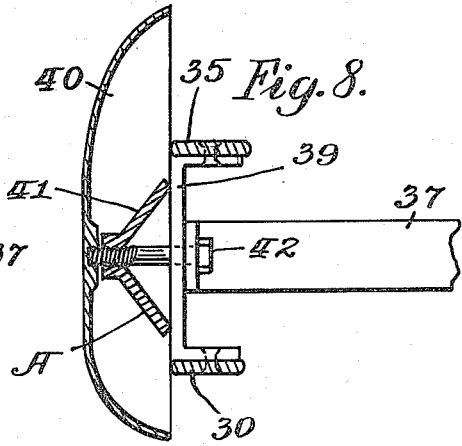
INVENTOR.
William W. Ache,
BY
ATTORNEY.

Patented Feb. 11, 1941

2,231,312

UNITED STATES PATENT OFFICE 2,231,312

COMBINED BUMPER AND HEADLIGHT

William W. Aché, Los Angeles, Calif.

Application January 23, 1939, Serial No. 252,241

5 Claims. (Cl. 240—7.1)

This invention relates to a combined bumper and headlight for vehicles. The primary object of the invention is to illuminate the roadway ahead of the vehicle below the plane of direct vision of approaching vehicles whereby the blinding effect which is so prevalent is prevented. Another object is to illuminate the roadway ahead of the vehicle through fog or smoke so as to provide greater safety in driving. Another object is to utilize the bumper as a guard so as to protect the lighting means against injury. Another object is to support the lighting means independently of the bumper when desired so that the latter may have free movement independently of the lamp or lamps to reduce the hazard of breaking the lamps. Another object is to construct a vehicle bumper so as to become an efficiently guarded lighting fixture in the horizontal plane of the bumper. Another object is to provide lighting means which obviates the necessity of switching from bright to dim when two cars are approaching from opposite directions. Another object is to provide a combined bumper and headlight with a system of lighting, a portion of which can be switched on or off to control the illumination of the sides of road when desired or which can be used for police, ambulance and other purposes. Another object is to provide lighting means in a bumper so as to obviate the use of other lamps in or upon the front fenders or other front portions of a vehicle. A further object is to prevent the glare and blinding effect through the back window from the lights of a vehicle proceeding in the same direction. A still further object is to provide a combined bumper and headlight which is simple and strong in construction and which is highly effective in use. To these ends my invention comprises the features of construction and combination of parts hereinafter described and claimed.

In the accompanying drawings forming part of this specification, Fig. 1 is a front perspective view of an automobile equipped with my improved bumper and headlight; Fig. 2 is a plan of my improved bumper and headlight showing a fragment of the front end of an automobile upon which it is mounted; Fig. 3 is a front elevation of the structure shown in Fig. 2; Fig. 4 is a section, on an enlarged scale, taken on the line 4—4 of Fig. 3; Fig. 5 is a diagram of the electric circuit by which the lights in the lamp housing are controlled; Fig. 6 is a plan of an alternate construction of my invention; Fig. 7 is a front elevation of the structure shown in Fig. 6; Fig. 8 is an enlarged section taken on line 8—8 of Fig. 7, and Fig. 9 is another enlarged section taken on line 9—9 of Fig. 7.

The improvement employs a bumper of any suitable type such as A, combined with a headlight unit such as B. The bumper as shown is typical of the kind now generally used on automobiles and comprises a horizontal impact member having a pair of laterally extending side impact arms 10 and 11, a pair of vertically and forwardly extending impact guards 12 and 13, which are spaced laterally apart and a pair of horizontal impact guard members 14 and 15 which are spaced vertically apart. These parts are rigidly united so as to form a rectangular frame C with the end arms 10 and 11 extending laterally therefrom, the horizontal guard members 14 and 15 thereof forming the opposite sides in a vertical plane of the frame and the vertical guards 12 and 13 the ends in the vertical plane of the frame. Each of the upper and lower flat side members 14 and 15 lies in a horizontal plane and is arranged edgewise facing forwardly to reinforce the strength of the bumper. Thus the frame produces a marginal guard surrounding the space within. The impact member of the bumper formed by the frame C and ends 10 and 11 is supported in the usual manner by the forwardly extending pair of brackets D, each member of which is secured on the front end of the chassis or body frame, of which the fragment 16 is shown in Fig. 2. The method of attaching these brackets to the chassis or body frame may be by means of clips 17 or any other suitable means.

In the rearward portion of the rectangular frame C, I arrange my improved headlight unit B, which is disposed to project light forwardly upon the roadway through the frame C, either directly ahead or upon either side of the roadway. The headlight unit may be of any suitable construction, that shown comprising a lamp holding housing formed by an inwardly curved wall 18 receding rearwardly and a pair of oppositely disposed vertical end walls 19 suitably joined to the housing to produce a rigid structure. The forwardly projecting upper and lower horizontal walls 20 of the housing together with the ends 19, form an inner margin, entering the rectangular frame C of the impact member freely to permit the bumper sliding over the casing in a forward and backward direction. A buffer strip 21 is secured between the inner margin of the housing and the outer marginal frame C of the impact member to prevent wear and objectionable sound and jar. The housing is firmly supported independently of the bumper by a pair of auxiliary bracket members 22 and an integral transverse supporting bar 23.

Arranged in the lamp housing are any suitable number of individual electric lamps E. As shown a horizontal row of four is employed but when desired a single lamp can be used. Each lamp may be of any suitable construction and as shown is of that type employing a parabolic reflector which is adapted to project a beam of light in a definite forward direction. Each of these lamps is rigidly supported in the lamp housing, the supporting means being a universal coupling 25, the fastening bolt 26 of which secures the lamp in adjusted position and simultaneously fastens by clamping the lamp and the lamp housing B upon the supporting bar 23 of the auxiliary brackets 22. In this manner each lamp may be adjusted to project its beam of light directly forward, or inclined in a horizontal or vertical plane. For instance the two center lamps may be set to project their beams directly ahead and down upon the roadway while the two outside lamps may be adjusted to illuminate the roadway, particularly at either side. These sets of lamps may be operated independently through the use of the switches 27 and 28 as illustrated in Fig. 5 so that when desired either set may be used. The front of the lamp housing is closed by a pair of transparent or translucent window plates 29 which are removably secured in the housing by the screws 30' or other suitable means. These window plates protect the lamps from dust and moisture. When desired they may be ornamented with display inscriptions for advertising purposes. The lamp housing shown is for a particular design of bumper. Its shape may be varied to suit any other design of bumper within the spirit of the invention.

From the above description it is seen that I have provided a central underslung headlight unit, which obviates the need of the two headlights such as are customarily used. Also I have provided a combined bumper and headlight which projects the light below the line of vision of the occupants of an approaching car thus avoiding the glare and blinding effect which is highly objectionable. Also the headlight unit projects the light under a fog thus giving the driver a more distant view in front while the side lights illuminate the sides of the road showing the driver how close he is to the edges. By placing the lighting unit in the bumper frame and close to the ground the discomfort of blinding and glaring lights through the back window of a car proceeding in the same direction is also avoided. By forming the bumper with a protecting frame in which the lamp housing is placed the lamps are protected against damage, also by supporting the lamp housing independently of the bumper on the frame of the automobile the impact member of the bumper may move more freely without damaging the housing.

In Figs. 6 to 9, I have shown the lamp housing B and impact member A of the bumper intimately united to produce a unitary structure. In this construction the lower horizontal guard member 30 of the impact member is formed with a rearwardly extending shelf 31 (see Figs. 6 and 9) upon which the lower wall 33 of the lamp housing B is rigidly secured. The upper wall 34 of the lamp housing is rigidly secured to the lower surface of the upper guard member 35 of the impact member. The usual brackets 37 and 38 are employed for supporting the impact member A, and the impact member in turn supports the lamp housing. The upper and lower horizontal members 35 and 30 are rigidly supported in spaced relation by a channel support 39 at each end to produce a rectangular frame in which the margin of the lamp housing is secured with the housing in receded position and protected by the impact elements of the bumper. Also a vertical ornamental guard 40 is provided at each end of the rectangular frame. The impact member A is provided with laterally extending end members 41 and 42 as in the preferred construction. A strong and rigid fastening means at each end of the rectangular frame is formed by mounting the upper and lower horizontal impact bars 35 and 30 upon the channel support 39 and by clamping the channel support and forward end of the bracket 37 tightly together. Also by clamping the corresponding lateral impact element such as 41 and vertical ornamental guard 40 together upon the channel support. A single bolt 42 serves to fasten these elements securely together. Each of the lamps 43 is adjustably held in the lamp housing by the universal coupling 44 and the windows 45 are removably held in the housing so as to protect the lamps. In this structure the unitary impact member and lamp housing constitute an efficient thoroughly guarded lighting fixture and bumper which serves to safeguard the vehicle and occupants thereof.

In accordance with the patent statutes, I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

I claim:

1. A combined bumper and headlight, comprising, a pair of laterally spaced bumper guards, a pair of vertically spaced impact members to which said bumper guards are connected and forming therewith an elongated marginal impact bumper guard frame having a forward passage therethrough, and a lamp element supported independently of said frame with its light emitting face disposed within the rearward portion thereof, whereby said guard frame has free movement without interfering with the lamp element and the lamp element is protected by said frame.

2. A combined bumper and headlight, comprising, a pair of upright bumper guards, a pair of comparatively wide upper and lower impact bumper bars connected by their ends to said guards and forming therewith an elongated deep marginal guard frame, and a lamp element supported independently of said frame with its light emitting face near the rearward end thereof and protected thereby, whereby the bumper guard frame has free movement to reduce the hazard of injuring the lamp element.

3. A combined vehicle bumper and headlight, comprising, laterally extending end impact members spaced endwise apart, an elongated deep marginal bumper impact frame having a pair of comparatively wide upper and lower impact bars arranged edgewise longitudinally of the vehicle, said frame being connected to said end impact members and said bars being arranged sufficiently apart vertically to provide a wide lamp receiving space therebetween, and a lamp element supported independently of said bumper impact frame and arranged with its light emitting face near the back portion of said marginal frame whereby said frame has free movement without interfering with the lamp element.

4. A combined bumper and headlight, comprising, a marginal impact bumper frame, means for attaching said frame to a vehicle, a lamp housing having its light emitting face near the rearward portion of said frame, and support means extending from the vehicle to the housing for sustaining the housing independently of the bumper frame, whereby the bumper frame has free movement without interfering with the housing and the housing and lamps therein are guarded by said frame.

5. A combined vehicle bumper and headlight, comprising, an elongated marginal impact bumper frame having upper and lower impact bars of sufficient width to form a deep protecting guard, means for attaching said frame to a vehicle, a lamp element supported independently of said frame having its light emitting face adjacent to the rearward portion of said frame to be protected by said bars, and a bracket member for supporting said lamp member adapted to be secured at its rearward end to the vehicle and having its forward end secured to said lamp element.

WILLIAM W. ACHÉ.